United States Patent
Fujii

(10) Patent No.: US 12,405,459 B2
(45) Date of Patent: Sep. 2, 2025

(54) ENDOSCOPE AND ENDOSCOPE MANUFACTURING METHOD

(71) Applicant: OLYMPUS MEDICAL SYSTEMS CORP., Hachioji (JP)

(72) Inventor: Toshiyuki Fujii, Machida (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 0 days.

(21) Appl. No.: 18/613,737

(22) Filed: Mar. 22, 2024

(65) Prior Publication Data
US 2024/0319490 A1    Sep. 26, 2024

Related U.S. Application Data

(60) Provisional application No. 63/491,968, filed on Mar. 24, 2023.

(51) Int. Cl.
*G02B 23/24* (2006.01)
*H04N 23/50* (2023.01)

(52) U.S. Cl.
CPC ....... *G02B 23/2484* (2013.01); *H04N 23/555* (2023.01)

(58) Field of Classification Search
CPC .......................... G02B 23/2484; H04N 23/555
See application file for complete search history.

(56) References Cited

U.S. PATENT DOCUMENTS

| | | | | |
|---|---|---|---|---|
| 2005/0277808 | A1* | 12/2005 | Sonnenschein | A61B 1/053 600/153 |
| 2009/0093725 | A1* | 4/2009 | Sato | H05K 1/147 600/462 |
| 2012/0004503 | A1* | 1/2012 | Kawaura | A61B 1/00128 600/104 |
| 2013/0244453 | A1* | 9/2013 | Sakamoto | H01R 12/721 439/55 |
| 2013/0244456 | A1* | 9/2013 | Sakamoto | A61B 1/00124 29/857 |
| 2017/0035279 | A1* | 2/2017 | Fujii | A61B 1/00018 |
| 2021/0093167 | A1* | 4/2021 | Fujisawa | A61B 1/05 |
| 2022/0322918 | A1* | 10/2022 | Takie | A61B 1/00124 |
| 2024/0206716 | A1* | 6/2024 | Nair | A61B 1/00027 |

FOREIGN PATENT DOCUMENTS

JP   2020-110483 A   7/2020

* cited by examiner

*Primary Examiner* — Peter D Le
(74) *Attorney, Agent, or Firm* — WHDA, LLP

(57) ABSTRACT

An endoscope includes: a first substrate includes: a plurality of first pads; a plurality of first cables each including an one end, the one end connected to the plurality of first pads; a plurality of second pads connected to a connection body; and a wiring adjustment circuit disposed between the plurality of first pads and the plurality of second pads. The wiring adjustment circuit is configured to electrically connect each of the plurality of first pads to each of the plurality of second pads corresponding to each of the plurality of first cables.

20 Claims, 8 Drawing Sheets

ENDOSCOPE AND ENDOSCOPE MANUFACTURING METHOD

CROSS-REFERENCE TO RELATED APPLICATION

This application is based on and claims priority under 35 U.S.C. § 119 to U.S. Provisional Application No. 63/491,968, filed Mar. 24, 2023, the entire contents of which are incorporated herein by reference.

BACKGROUND

The present disclosure relates to an endoscope and an endoscope manufacturing method.

Conventionally, in a method of manufacturing an imaging device mounted on an endoscope shown in Patent Document 1, arranging cable core wires and setting jigs during a cable connection process is complicated. As a result, since the required time becomes longer and the cost increases, there is room for improvement in this respect.

[Patent Document 1] Japanese Unexamined Patent Application, First Publication No. 2020-110483

SUMMARY

An endoscope according to a first aspect of the present disclosure is an endoscope including: a first substrate including: a plurality of first pads; a plurality of second pads configured to be connected to a connection body; and a wiring adjustment circuit disposed between the plurality of first pads and the plurality of second pads, and a plurality of first cables, each of the plurality of first cables including a first end, the first end connected to the plurality of first pads. The wiring adjustment circuit is configured to electrically connect each of the plurality of first pads to each of the plurality of second pads corresponding to each of the plurality of first cables.

An endoscope manufacturing method according to a second aspect of the present disclosure is a method of manufacturing the endoscope including: providing a plurality of first pads and a plurality of second pads on a first substrate; connecting a first end of each of a plurality of first cables to each of the plurality of first pads; and adjusting a wiring between the plurality of first pads and the plurality of second pads according to a wiring pattern of the plurality of first cables on the plurality of first pads by a wiring adjustment circuit.

DETAILED DESCRIPTION

First Embodiment

An endoscope and an endoscope manufacturing method according to a first embodiment of the present disclosure will be described with reference to FIGS. 1 to 4.

Figure 1:
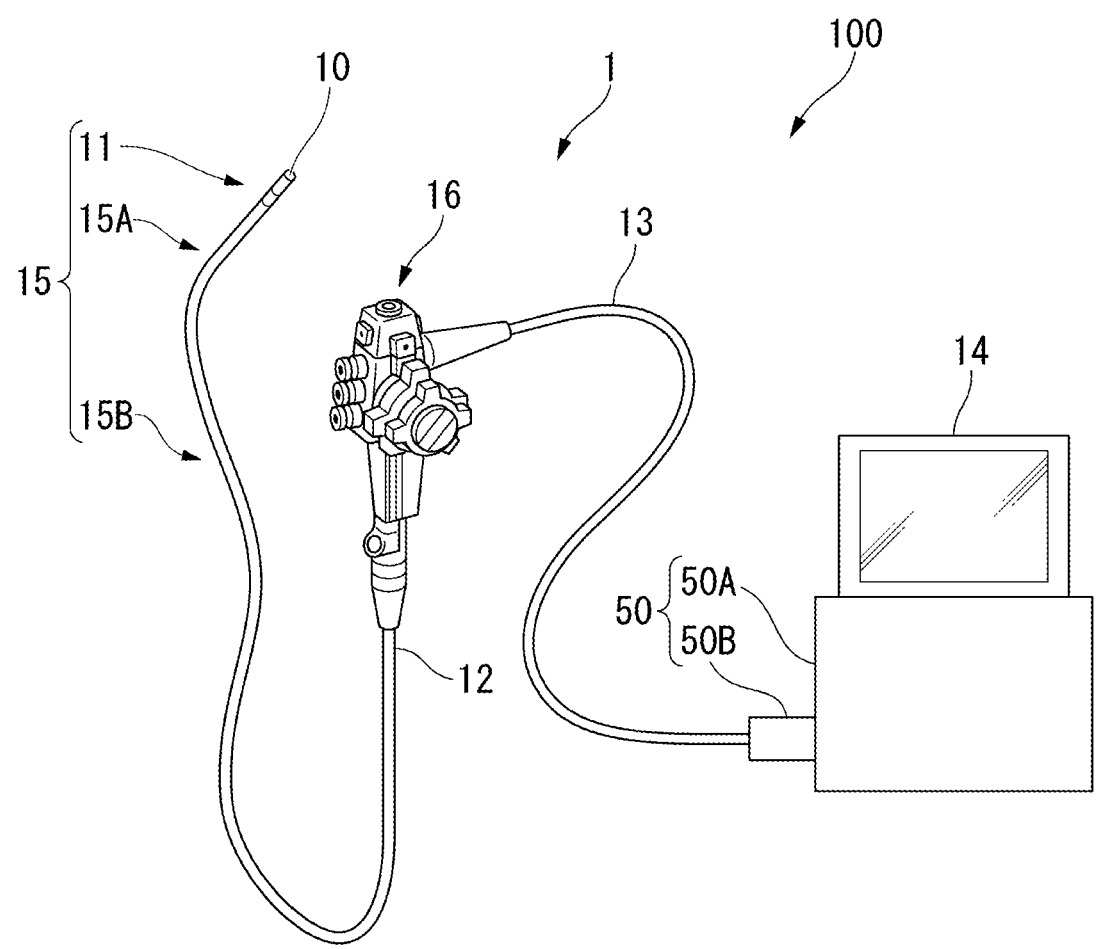
FIG. 1 is a perspective view of an endoscope system according to a first embodiment.

FIG. 1 is a perspective view of an endoscope system 100.

The endoscope system 100 includes an endoscope 1, a universal cord 13, an external processor unit 50, and a display device 14. The external processor unit 50 includes a control unit 50A and a light source device 50B and are connected to the endoscope 1 via the universal cord 13.

The endoscope 1 is a device for observing or treating an affected area within the body. The endoscope 1 includes an insertion section 15 and an operation section 16. Furthermore, in this embodiment, the endoscope 1 is a flexible endoscope, but the endoscope 1 may be another type of endoscope (for example, a rigid endoscope or an ultrasonic endoscope).

The insertion section 15 is a long tubular member that is inserted into the body. The insertion section 15 includes a rigid distal end portion 11, a bending portion 15A which can be bent in a plurality of different directions, and a flexible tube portion 15B having flexibility. The distal end portion 11, the bending portion 15A, and the flexible tube portion 15B are connected in order from the distal end side. The flexible tube portion 15B is connected to the operation section 16.

The distal end portion 11 includes a scope 17. The scope 17 includes a light source, an optical system, and a camera unit (imaging unit 10). The bending portion 15A is bent by the operator's operation of the operation section 16. The flexible tube portion 15B is a flexible tubular portion.

The operation section 16 receives an operation for the endoscope 1. The universal cord 13 is connected to the operation section 16.

The external processor unit 50 comprehensively controls the entire endoscope system 100. The external processor unit 50 performs image processing on a video signal output from the imaging unit 10. The light source device 50B of the external processor unit 50 supplies illumination light emitted by the light source. The light source device 50B includes, for example, a halogen lamp or an LED. The light source device 50B supplies the generated illumination light to the light source under the control of the control unit 50A.

The display device 14 displays images of the affected area captured by the endoscope 1 and various information regarding the endoscope system 100.

The imaging unit 10 and the control unit 50A are connected by a first connection member 4 (a plurality of first cables). The first connection member 4 is a general term for a transmission path composed of a cable inserted through the insertion section 15 of the endoscope 1, the universal cord 13, and the like.

The imaging unit 10 converts a subject image formed via the optical system to generate an imaging signal. The imaging unit 10 outputs the generated imaging signal to the control unit 50A via the first connection member 4. Further, the imaging unit 10 receives electric power from the control unit 50A via another first connection member 4.

Figure 2:
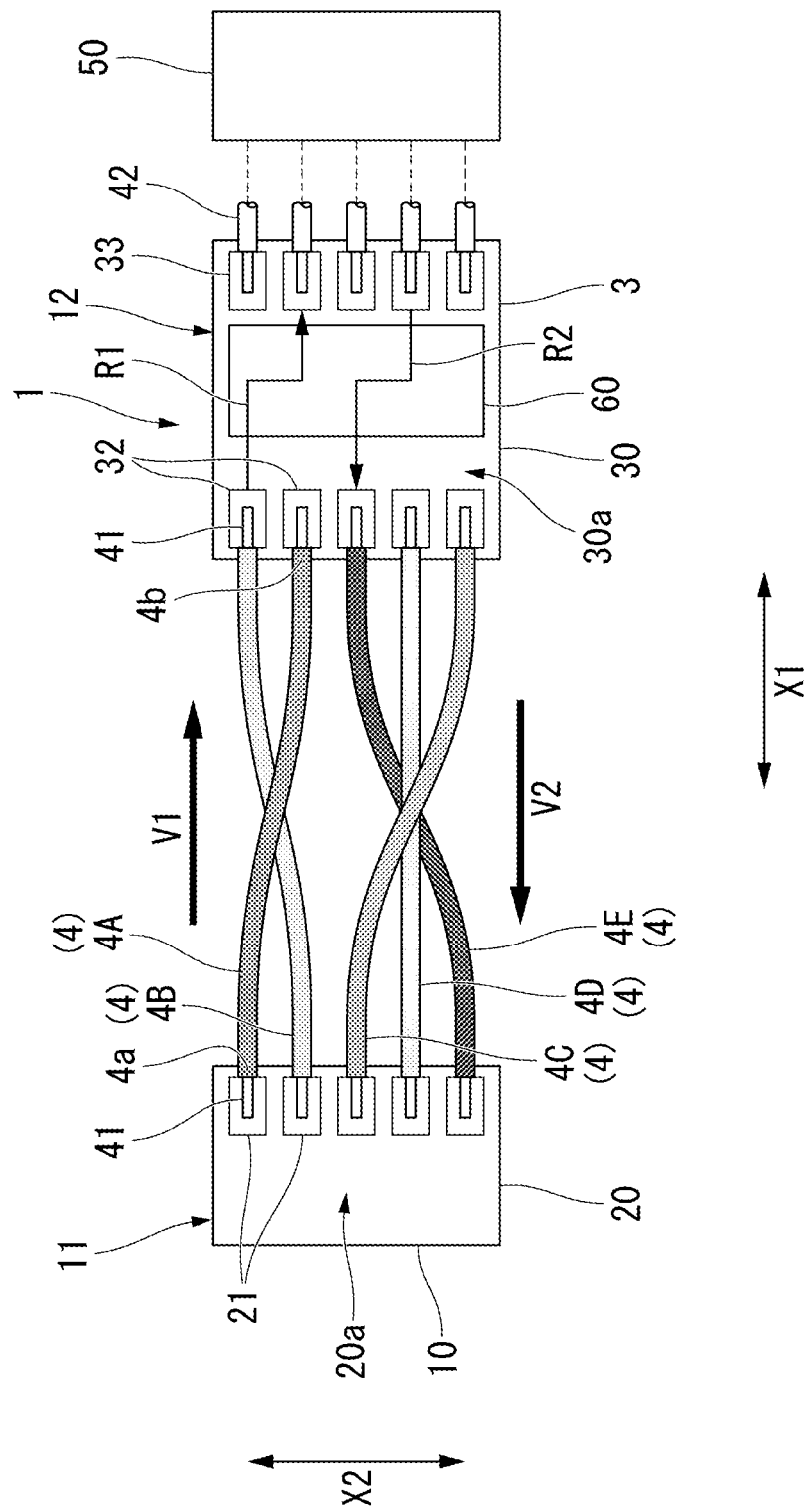
FIG. 2 is a plan view showing an outline of a connection portion of a distal end portion and a proximal end portion of an endoscope according to the first embodiment.

As shown in FIG. 2, the endoscope 1 according to the first embodiment includes the distal end portion 11 which is inserted into a subject and a proximal end portion 12 which is connected to the external processor unit 50. As described above, the external processor unit 50 is disposed outside the endoscope 1 and includes a drive circuit or a video processor.

Furthermore, the external processor unit 50 is not limited to one including a drive circuit or a video processor and may be the universal cord 13 attached to the operation section 16 shown in FIG. 1. The universal cord 13 connects the endoscope 1 and the external device. An imaging cable, optical fiber cable, or the like that outputs the imaging signal captured by the imaging unit 10 to the outside is inserted into the universal cord. In this embodiment, the external processor unit 50 is the video processor.

Here, in the endoscope 1 shown in FIG. 2, the directions used in the description in this embodiment are set such that the right to left direction of the paper is the front to rear direction X1 and the up to down direction of the paper is the width direction X2. Further, in the front to rear direction X1, the side of the distal end portion 11 (the side of the imaging unit 10 to be described later) is referred to as the front side (distal end side) and the side of the proximal end portion 12 (the side of the external processor unit 50) is referred to as the rear side.

The endoscope 1 is a known flexible endoscope, for example, a camera that is a medical flexible endoscope. The endoscope 1 includes an elongated insertion section which extends in the front to rear direction X1 and is inserted into an observation object from its distal end and a connector 3 which is electrically connected to a rear portion of the insertion section. The endoscope 1 can transmit and receive electric power and various signals (video signals, control signals, and the like) to and from the external processor unit 50. Furthermore, the endoscope 1 is not limited to a medical camera, and may be an industrial camera.

The video processor 50 has a socket portion (not shown) on the front side and the connector 3 provided at the proximal end portion 12 of the endoscope 1 is connected to this socket portion. The external processor unit 50 performs well-known image processing and the like on still images or moving images obtained by photographing the inside of the observation object (subject).

The above-described electric power and various control signals are guided from the connector 3 to the insertion section 15 via the plurality of first connection members 4 inserted into the insertion section 15 (see FIG. 1). The data of the captured image output from the imaging unit 10 provided at the distal end portion 11 is electrically connected and transmitted from the connector 3 to the external processor unit 50 via the first connection member 4. The external processor unit 50 performs well-known image processing such as color correction and gradation correction on the data of the captured image transmitted from the connector 3, and outputs the data of the captured image after the image processing on the display device 14 (see FIG. 1). As described above, the display device 14 is a monitor device having a display device such as a liquid crystal display panel, and displays the data of the captured image of the subject captured by the endoscope 1.

The imaging unit 10 is provided to capture an image of the observation object, includes an imaging device such as a CCD or CMOS, and can capture an image of an area to be treated.

The endoscope 1 is formed with a small diameter so that the endoscope can be inserted into the subject. Furthermore, examples of the subject in this embodiment include human blood vessels, ureters, pancreatic ducts, bile ducts, bronchioles, and the like.

The distal end portion 11 is provided with the imaging unit 10 and a front circuit board 20 (second substrate) having a plurality of third pads 21 connected to the imaging unit 10.

One surface of the front circuit board 20 in the thickness direction is formed as a mounting surface 20a. The mounting surface 20a is provided with the plurality of first pads 21. The front circuit board 20 is formed into a rectangular shape when viewed from a direction orthogonal to the mounting surface 20a.

The plurality of third pads 21 (five in the illustrated example of FIG. 2) are arranged on the front circuit board 20. The plurality of third pads 21 are arranged on the rear portion side of the front circuit board 20 at predetermined intervals in the width direction X2. Each third pad 21 is used for circuit connection such as a power supply, an image signal, GND (ground), CLK (for example, clock and command input from the external processor unit 50), and the like. The plurality of third pads 21 are set in an area with a size and shape that allow connection to the core wires 41 of any of the first connection members 4. Furthermore, the number and arrangement of the third pads 21 are not limited thereto.

Each third pad 21 is electrically connected to any one of the plurality of (here, five) first connection members 4 (4A, 4B, 4C, 4D, and 4E) by soldering. In each first connection member 4, the outer periphery of the core wire 41 is covered with a coating material. The width of each third pad 21 is set to be equal to or larger than the diameter of the first connection member 4 that is the thickest one among the plurality of first connection members 4. Furthermore, the plurality of first connection members 4 are connected with an extension direction orthogonal to the width direction X2 of the third pad 21 and a first pad 32 to be described later.

The first connection members 4 (4A, 4B, 4C, 4D, 4E) are classified into different colors. For example, 4A is red, 4B is orange, 4C is blue, 4D is black, and 4E is yellow. A rear end 4b (one end) of the first connection member 4 is introduced into the connector 3. The core wires 41 of the plurality of first connection members 4 introduced into the connector 3 are soldered to a predetermined circuit terminal (first pad 32 described later) of a rear circuit board 30 provided in the connector 3 of the proximal end portion 12. Accordingly, the data of the captured image output from the imaging unit 10 is transmitted from the connector 3 to the external processor unit 50 via the first connection member 4.

The proximal end portion 12 is provided with the rear circuit board 30 (first substrate) including the plurality of first pads 32 which are connected to the plurality of third pads 21 by the plurality of first connection members 4 and a plurality of second pads 33 which connect the plurality of first pads 32 to the external processor unit 50. The rear circuit board 30 is provided with a wiring alignment mechanism 60 (wiring adjustment circuit) between the plurality of first pads 32 and the plurality of second pads 33.

One surface of the rear circuit board 30 in the thickness direction is formed as a mounting surface 30a. The plurality of first pads 32, the plurality of second pad 33, and the wiring alignment mechanism 60 are provided on the mounting surface 30a. The rear circuit board 30 is formed into a rectangular shape when viewed from a direction orthogonal to the mounting surface 30a.

The plurality of first pads 32 (five in the illustrated example of FIG. 2) are arranged on the rear circuit board 30. The plurality of first pads 32 are arranged at predetermined intervals in the width direction X2 on the front side of the rear circuit board 30. Each first pad 32 is used for circuit connection such as a power supply, an image signal, GND (ground), CLK (for example, clock and command input from the video processor 50), and the like. The plurality of first pads 32 are set in an area with a size and shape that allow connection to the core wires 41 of any of the first connection members 4. Furthermore, the number and arrangement of the first pads 32 are not limited thereto.

Each first pad 32 is electrically connected to any one of the plurality of (here, five) first connection members 4 (4A, 4B, 4C, 4D, and 4E) respectively connected to the third pads 21 by soldering. The width of each first pad 32 is set to be equal to or larger than the diameter of the first connection member 4 that is the thickest one among the plurality of first connection members 4.

The plurality of second pads 33 (five in the illustrated example of FIG. 2) are arranged on the rear circuit board 30. Each second pad 33 is used for circuit connection such as a power supply, an image signal, GND (ground), CLK (for example, clock and command input from the video processor 50), and the like. Furthermore, the number and arrangement of second pads 33 are not limited thereto.

A second connection member 42 (connection body) connected from the proximal end portion 12 to the external processor unit 50 is electrically connected to the second pad 33.

Furthermore, the second connection member 42 is not limited to a cable having the same structure as the first connection member 4, but can be a substrate or a connector having a circuit board.

The wiring alignment mechanism 60 includes a first wiring route R1 and a second wiring route R2. The first wiring route R1 connects a first wiring V1 connected to one of the plurality of first pads 32 to one of the plurality of second pads 33 corresponding to the first wiring V1 so that the external processor unit 50 is electrically connected to the first wiring V1. The second wiring route R2 connects a second wiring V2 connected to one of the plurality of second pads 33 to one of the plurality of first pads 32 corresponding to the second wiring V2 so that the imaging unit 10 is electrically connected to the second wiring V2. The first wiring V1 is at least one of the plurality of first connection members 4. The second wiring V2 is at least one of the second connection members 42. As described above, the first wiring V1 includes a signal line, a power source, and a ground.

Furthermore, the wiring alignment mechanism 60 is not limited to one including both the first wiring route R1 and the second wiring route R2 as in this embodiment, and may include at least one of the first wiring route R1 and the second wiring route R2. The wiring alignment mechanism 60 can be a circuit.

As the wiring alignment mechanism 60, an analog mechanism having a circuit installation area (not shown) is adopted as an example. This circuit installation area is provided with a bridge circuit that can be installed to arrange the wiring according to the wiring order of the plurality of randomly wired first connection members 4. That is, in the wiring alignment mechanism 60, a bridge circuit of a plurality of wiring patterns using the plurality of first connection members 4 is facilitated in advance.

Specifically, since there are five connection portions (first pad 21, second pad 32) on each of the front and rear ends 4a and 4b of the first connection member 4, 120 patterns of analog bridge circuits are prepared in the circuit installation area. Then, when manufacturing the endoscope 1, the color combinations of the first connection members 4 connected to each of the third pad 21 and the first pad 32 are identified using an imaging device 70 (see FIG. 4) to be described later to acquire the arrangement data of the plurality of first connection members 4. Then, the wiring of the first connection member 4 connected to the third pad 21 and the first pad 32 in a random order is checked, the bridge circuit corresponding to the wiring pattern is selected, and the bridge circuit is incorporated into the circuit installation area of the wiring adjustment mechanism 60, thereby obtaining a function of aligning the wirings of the plurality of first connection members 4.

Further, as another example of the wiring alignment mechanism 60, a digital mechanism may be adopted that allows a plurality of types of bridge circuits to be switched in the circuit installation area after connecting the first connection member 4 in order to correspond to various wiring switching. In this case, the wiring alignment mechanism 60 has a configuration in which the wiring can be switched by software using a program such as a relay circuit according to the arrangement data (arrangement pattern of the plurality of first connection members 4 (4A to 4E)) acquired using the above-described imaging device 70.

Next, a method of manufacturing the endoscope 1 according to this embodiment will be described in detail. Here, a method of connecting the first connection member 4 to the distal end portion 11 and the proximal end portion 12 will be described.

First, as shown in FIG. 2, the front circuit board 20 in the imaging unit 10 of the distal end portion 11 is placed on a surface plate (not shown) of which a top surface is a horizontal surface, for example, with the mounting surface 20a facing upward. Then, any one of the first connection members 4A to 4E each having the core wire 41 exposed at the front cable end 4a is randomly arranged to face the third pad 21 and is connected to each of the plurality of third pads 21 of the front circuit board 20 by soldering in a misaligned state.

Next, the rear circuit board 30 in the connector 3 of the proximal end portion 12 is placed on a surface plate (not shown) of which a top surface is a horizontal surface, for example, with the mounting surface 30a facing upward. Then, any one of the first connection members 4A to 4E each having the core wire 41 exposed at the rear cable end 4b is randomly arranged to face the first pad 32 and is connected to each of the plurality of first pads 32 of the rear circuit board 30 by soldering in a misaligned state.

Figure 3:
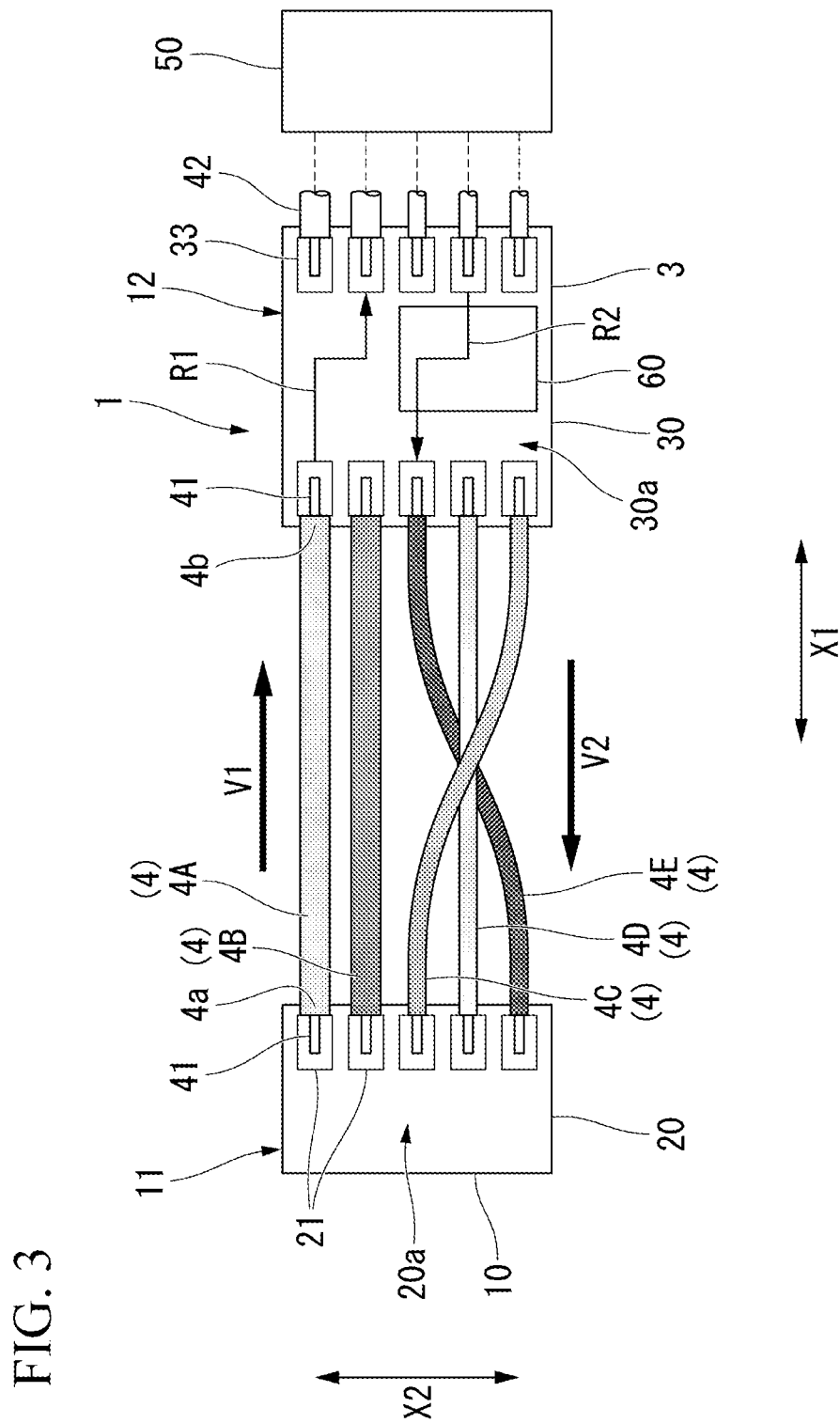
FIG. 3 is a plan view showing an outline of a connection portion of an endoscope according to a first modified example.

Furthermore, as in a first modified example shown in FIG. 3, when a special cable is adopted as a part of the first connection member 4, both ends of the special cable may be connected to predetermined fixed positions on the third pad 21 and the first pad 32. For example, when three of the plurality of (five) first connection members 4 (first connection members 4C, 4D, and 4E) are normal diameter cables and the remaining two cables (first connection members 4A and 4B) are special large diameter cables, the large diameter cables are connected to the predetermined third and first pads 21 and 32 by soldering and the normal diameter cables are arranged randomly and are connected to the remaining third and first pads 21 and 32 by soldering in a misaligned state.

Further, the plurality of (five in this case) second connection members 42 each having a core wire 41 exposed at one end are connected to the plurality of second pads 33 of the mounting surface 30a of the rear circuit board 30 placed on the surface plate by soldering. Further, the other ends of the plurality of second connection members 42 are connected to the external processor unit 50. Accordingly, the plurality of first connection members 4 connected to the imaging unit 10 can be electrically connected to the respective pads 21, 32, and 33 and the connection of the first connection member 4 to the external processor unit 50 is completed.

Figure 4:
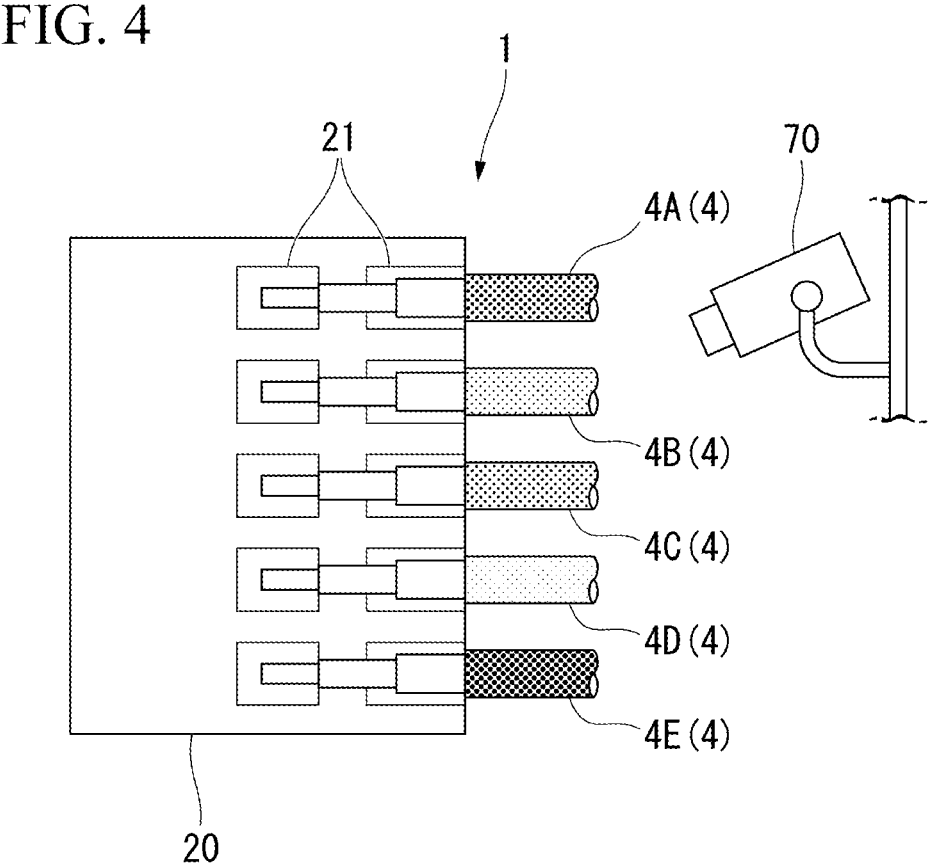
FIG. 4 is a plan view showing a configuration of an imaging device at a proximal end portion.

Next, since there are five pads 21 and 32 on each of the front and rear ends 4a and 4b of the first connection member 4, 120 patterns of analog bridge circuits are prepared in the wiring alignment mechanism 60. Then, the color combinations of the ten first connection members 4A to 4E connected to each of the third pad 21 and the first pad 32 are identified using the imaging device 70 as shown in FIG. 4 to acquire the arrangement data of the plurality of first connection members 4. Then, a bridge circuit that matches the arrangement data (arrangement pattern of the plurality of first connection members 4 (4A to 4E)) acquired by the imaging device 70 is extracted from 120 patterns, and the wiring is switched using a program. Accordingly, in the wiring alignment mechanism 60, a necessary wiring route is formed by arranging the randomly wired wires according to the first connection members 4.

In this way, in the method of manufacturing the endoscope 1, the plurality of (five) first connection members 4 are classified into different colors and the colors of the plurality of first connection members 4 are identified using the imaging device 70 with a camera to acquire the arrangement data of the plurality of first connection members 4. Then, the arrangement data is input to the wiring alignment mechanism 60. In the imaging device 70, the color of the first connection member 4 connected to each of the pads 21 and 32 is visually recognized. When connecting the first connection member 4 to the pads 21 and 32, the connection order of the first connection members 4 can be recognized by the camera of the imaging device 70. This result is input to the wiring alignment mechanism 60.

As described above, the endoscope 1 of this embodiment includes the distal end portion 11 which is inserted into the subject and the proximal end portion 12 which is connected to the external processor unit 50. The endoscope 1 includes: the imaging unit 10 which is provided at the distal end portion 11; the front circuit board 20 which is provided at the distal end portion 11 and is provided with the plurality of third pads 21 connected to the imaging unit 10; the rear circuit board 30 which is provided at the proximal end portion 12 and is provided with the plurality of first pads 32 connected to the plurality of second pads 21 by the plurality of first connection members 4 and the plurality of second pads 33 connected to the external processor unit 50 by the plurality of second connection members 42; and the wiring alignment mechanism 60 which is provided between the plurality of first pads 32 and the plurality of second pads 33 in the rear circuit board 30. The wiring alignment mechanism 60 includes the first wiring route R1 which connects the first wiring V1 connected to one of the plurality of first pads 32 to one of the plurality of second pads 33 corresponding to the first wiring V1 so that the external processor unit 50 is electrically connected to the first wiring V1 and the second wiring route R2 which connects the second wiring V2 connected to one of the plurality of second pads 33 to one of the plurality of first pads 32 corresponding to the second wiring V2 so that the imaging unit 10 is electrically connected to the second wiring V2.

Further, the endoscope manufacturing method of this embodiment includes: providing the plurality of third pads 21 in the front circuit board 20; providing the plurality of first pads 32 in the rear circuit board 30; electrically connecting the third pad 21 and the first pad 32 by the plurality of first connection members 4; electrically connecting the first pad 32 and the second pad 33; and forming at least one of the first wiring route R1 and the second wiring route R2 using the wiring adjustment mechanism 60.

Accordingly, in this embodiment, in the steps of manufacturing the endoscope 1, for each of the plurality of third pads 21 of the front circuit board 20 at the distal end portion 11, any one of the plurality of first connection members 4A to 4E each having the core wire 41 exposed at the front cable end 4a is randomly connected to the third pad 21. Further, for each of the plurality of first pads 32 of the rear circuit board 30 at the proximal end portion 12, any one of the plurality of first connection members 4A to 4E having the core wire 41 exposed at the rear cable end 4b is randomly connected to the first pad 32. Further, the plurality of (here, five) second connection members 42 each having the core wire 41 exposed at one end are connected to each of the plurality of second pads 33 of the mounting surface 30a of the rear circuit board 30 and the other ends of the plurality of second connection members 42 are connected to the external processor unit 50.

Accordingly, the plurality of first connection members 4 connected to the imaging unit 10 can be electrically connected to the respective pads 21, 32, and 33 and the connection of the first connection member 4 to the external processor unit 50 is completed. Then, the wiring alignment mechanism 60 includes a mechanism for switching the wiring pattern according to the wiring pattern of the first connection members 4 from the proximal end portion side to the distal end portion side and forms at least one of the first wiring route R1 and the second wiring route R2. Accordingly, it is possible to form a necessary wiring route by aligning the wirings according to the first connection members 4 randomly wired.

Here, as a conventional endoscope manufacturing method, semi-automatic cable connection using laser cutting and pulse heating equipment has been proposed with the aim of reducing costs, but full automation has not yet been achieved. In other words, arranging cables and setting jigs is complicated and difficult to automate, and some processes require manual labor. In contrast, in this embodiment, the first connection members 4A to 4E can be aligned with the pads 21 and 32 in a random order. Therefore, the work of arranging the cables becomes unnecessary, the work of connecting the first connection member 4 can be made more efficient, the process can be shortened, and costs can be reduced. Therefore, the wiring alignment mechanism 60 can be used to automate or semi-automate the alignment work.

Further, in this embodiment, the first wiring V1 is at least one of the plurality of first connection members 4. The second wiring V2 is at least one of the plurality of second connection members 42. Therefore, the first wiring V1 output from the imaging unit 10 is transmitted to the external processor unit 50 via the first pad 32 and the second pad 33 and the second wiring V2 output from the external processor unit 50 is transmitted to the imaging unit 10 via the second pad 33, the first pad 32, and the third pad 21.

Further, in this embodiment, the plurality of first connection members 4 connected with the extension direction orthogonal to the width direction X2 of the third pad 21 and the first pad 32 and the width dimension of each of the third pad 21 and the first pad 32 is equal to or larger than the diameter of the first connection member 4 that is the thickest one among the plurality of first connection members 4. Therefore, even when connecting the plurality of first connection member 4 having a plurality of different outer diameters, the thickest first connection member 4 can be reliably connected to any of the plurality of pads 21 and 32 among the plurality of pads 21 and 32 without protruding.

Further, in this embodiment, the wiring adjustment mechanism 60 has a circuit installation area in which a bridge circuit that aligns the wiring according to the wiring of the plurality of first connection members 4 can be incorporated. Therefore, in this embodiment, the bridge circuit of the plurality of wiring patterns using the plurality of first connection members 4 is facilitated in advance, the wiring of the randomly connected first connection member 4 is checked, the bridge circuit corresponding to the wiring pattern is selected, and the bridge circuit is incorporated into the circuit installation area of the wiring adjustment mechanism 60. In this way, the wirings of the plurality of first connection members 4 can be aligned.

Further, in this embodiment, since the wiring adjustment mechanism includes a mechanism for switching the wiring using a program according to the arrangement pattern of the plurality of first connection members 4, the wiring can be switched by software using a program of a relay circuit or the like according to the acquired arrangement data (arrangement pattern of the plurality of first connection members 4 (4A to 4E)). Therefore, it becomes possible to automate the alignment work more easily.

According to the endoscope 1 and the method of manufacturing the endoscope 1 of this embodiment, it is possible to reduce the work required to align the first connection members 4 when connecting cables and to improve work efficiency, shorten process time, and reduce costs. Further, according to the endoscope 1 and the method of manufacturing the endoscope 1 of this embodiment, cable connections can be automated or semi-automated.

Although the embodiment of the present disclosure has been described above in detail with reference to the drawings, the specific configuration is not limited to this embodiment, and design changes and the like may be made without departing from the spirit of the present disclosure. Further, the components shown in the above-described embodiments and modified examples can be configured by appropriately combining them.

Second Embodiment

Figure 5:
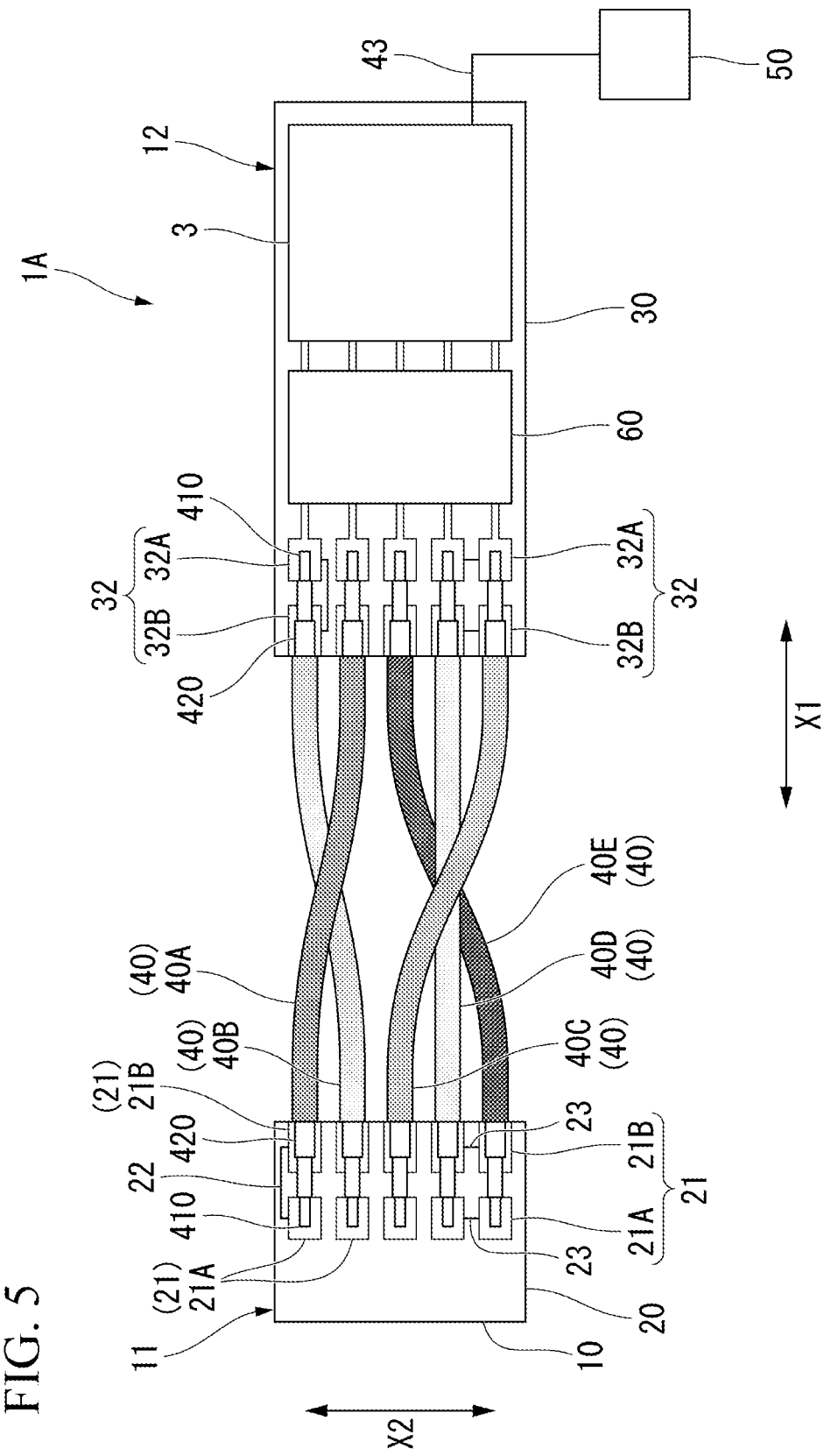
FIG. 5 is a plan view showing an outline of a connection portion of an endoscope according to a second embodiment.

As shown in FIG. 5, an endoscope 1A according to a second embodiment adopts a plurality of (here, five) coaxial cables 40 (40A, 40B, 40C, 40D, and 40E) including a core wire 410 and a shield 420 covering the outer periphery of the core wire 410 as a plurality of first connection members connecting the distal end portion 11 and the proximal end portion 12. Five coaxial cables 40 are respectively classified into different colors. The shield 420 prevents static electricity from being applied to the core wire 410 from the outside and electrostatic damage to electronic components such as an imaging element of the imaging unit 10. The shield 420 may be, for example, a metal foil such as aluminum, a braided shield made of thin conductive wires knitted into a mesh, or a two-layered structure of a metal foil and a braided shield. The outer peripheries of the plurality of coaxial cables 40 are further covered with a tubular cable sheath (not shown) made of soft insulating resin.

The third pad 21 includes a core wire pad 21A which is connected to the core wire 410 and a shield pad 21B which is connected to the shield 420. The pair of core wire pads 21A and shield pads 21B are arranged at intervals in the front to rear direction X1. A plurality of pairs of core wire pads 21A and shield pads 21B are arranged in the width direction X2. The first pad 32 includes a core wire pad 32A which is connected to the core wire 410 and a shield pad 32B which is connected to the shield 420. A pair of core wire pads 32A and shield pads 32B are arranged at intervals in the front to rear direction X1. A plurality of pairs of core wire pads 32A and shield pads 32B are arranged in the width direction X2.

Even in the endoscope 1A according to the second embodiment, as in the first connection member 4 (see FIG. 2) of the above-described first embodiment, any one of the coaxial cables 40 each having the core wire 410 and the shield 420 exposed at the front cable end 40a is randomly arranged and connected to each of the plurality of first pads 21 of the front circuit board 20 in a misaligned state by soldering. The same applies to the connection of a rear cable end 40b of the coaxial cable 40 to the first pad 32 of the rear circuit board 30.

In the method of manufacturing the endoscope 1A according to the second embodiment, since there are five pads 21 (21A, 21B) and 32 (32A, 32B) on each of both front and rear ends 40a and 40b of the coaxial cable 40, 120 patterns of analog bridge circuits are prepared in the wiring alignment mechanism 60. Then, the color combinations of the ten coaxial cables 40 connected to each of the third pad 21 and the first pad 32 are identified using the imaging device 70 (see FIG. 4) to acquire the arrangement data of the plurality of coaxial cables 40 (40A to 40E). The bridge circuit matching the acquired arrangement data (the arrangement pattern of the plurality of coaxial cables 40) is extracted from 120 patterns and the wiring is switched using a program. Accordingly, in the wiring alignment mechanism 60, a necessary wiring route is formed by aligning the wiring according to the randomly wired coaxial cables 40.

Further, in the second embodiment, at least one (here, one coaxial cable 40A) of the plurality of (five) coaxial cables 40 on the side of the distal end portion 11 electrically connects the core wire pad 21A and the shield pad 21B by a first connection line 22. Accordingly, in the coaxial cable 40A, the core wire 410 and the shield 420 can be used for the same function, and can be used as low impedance wiring (for example, power cable).

Further, in the second embodiment, at least two (here, two coaxial cables 40D and 40E) of the plurality of (five) coaxial cables 40 on the side of the distal end portion 11 electrically connect the core wire pads 21A and the shield pads 21B by a second connection line 23. Accordingly, the coaxial cables 40D and 40E can be used for the same function and can be used as low impedance wiring (for example, ground).

Furthermore, the first connection line 22 and the second connection line 23 can use the core wire 410 and the shield 420 for the same function on the side of the proximal end portion 12 as well as on the side of the distal end portion 11 and can use the plurality of coaxial cables 40 for the same function.

Third Embodiment

Figure 6:
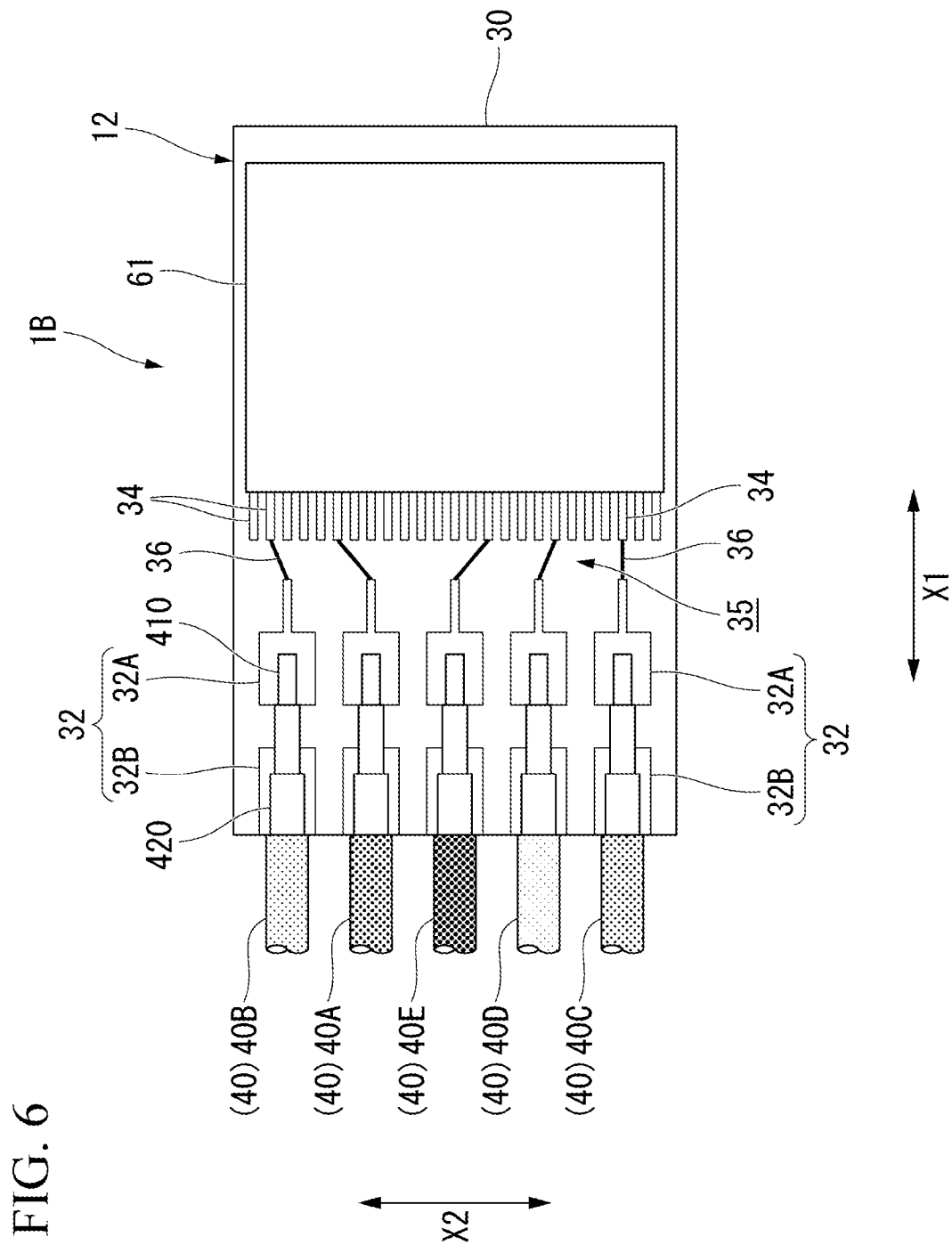
FIG. 6 is a plan view showing an outline of a connection portion of an endoscope according to a third embodiment.

As shown in FIG. 6, an endoscope 1B according to a third embodiment is provided with a wiring adjustment mechanism 61 that allows a wiring (a connection wiring 36 to be described later) to select a conduction destination after connecting the coaxial cable 40 of the second embodiment to each of the pads 21 and 32.

The wiring adjustment mechanism 61 will be described. In the connector 3, a plurality of first conduction tip portions 34 corresponding to all of the plurality of coaxial cables 40 (40A, 40B, 40C, 40D, and 40E) are provided for each of the plurality of (five) first pads 32. Further, an unwired area 35 is provided in a state before manufacturing between the core wire pads 32A of the plurality of first pads 32 and the plurality of first conduction tip portions 34 in the front to rear direction X1.

The first conduction tip portions 34 are provided at five positions corresponding to the number of coaxial cables 40 for one core pad 32A. Therefore, the rear circuit board 30 is provided with a total of 25 first conduction tips 34. The plurality of first conduction tip portions 34 are arranged to protrude forward from the connector 3.

In the wiring adjustment mechanism 61, a necessary wiring route is formed by aligning the wirings according to the randomly wired coaxial cable 40 in such a manner that the connection wiring 36 is formed in the unwired area 35 so that the plurality of first pads 32 and one of the plurality of first conduction tip portions 34 are selectively connected according to the wiring of the plurality of coaxial cables 40. As the connection wiring 36, for example, solder jet bumping, cream solder, additional jumper wire, and the like can be adopted. When connecting with an additional jumper wire, even if the distance in the width direction X2 between the first pad 32 selected for connection and the first conduction tip portion 34 is far, the connection work can be performed more efficiently.

In the connection method using the wiring adjustment mechanism 61 according to the third embodiment, the plurality of first pads 32 and one of the plurality of first conduction tip portions 34 are selectively connected according to the wiring of the plurality of coaxial cables 40. In this way, an arbitrary circuit can be formed by connecting the predetermined core wire pad 32A and the arbitrarily selected first conduction tip portion 34 in the unwired area 35 by the connection wiring 36.

Fourth Embodiment

Figure 7:
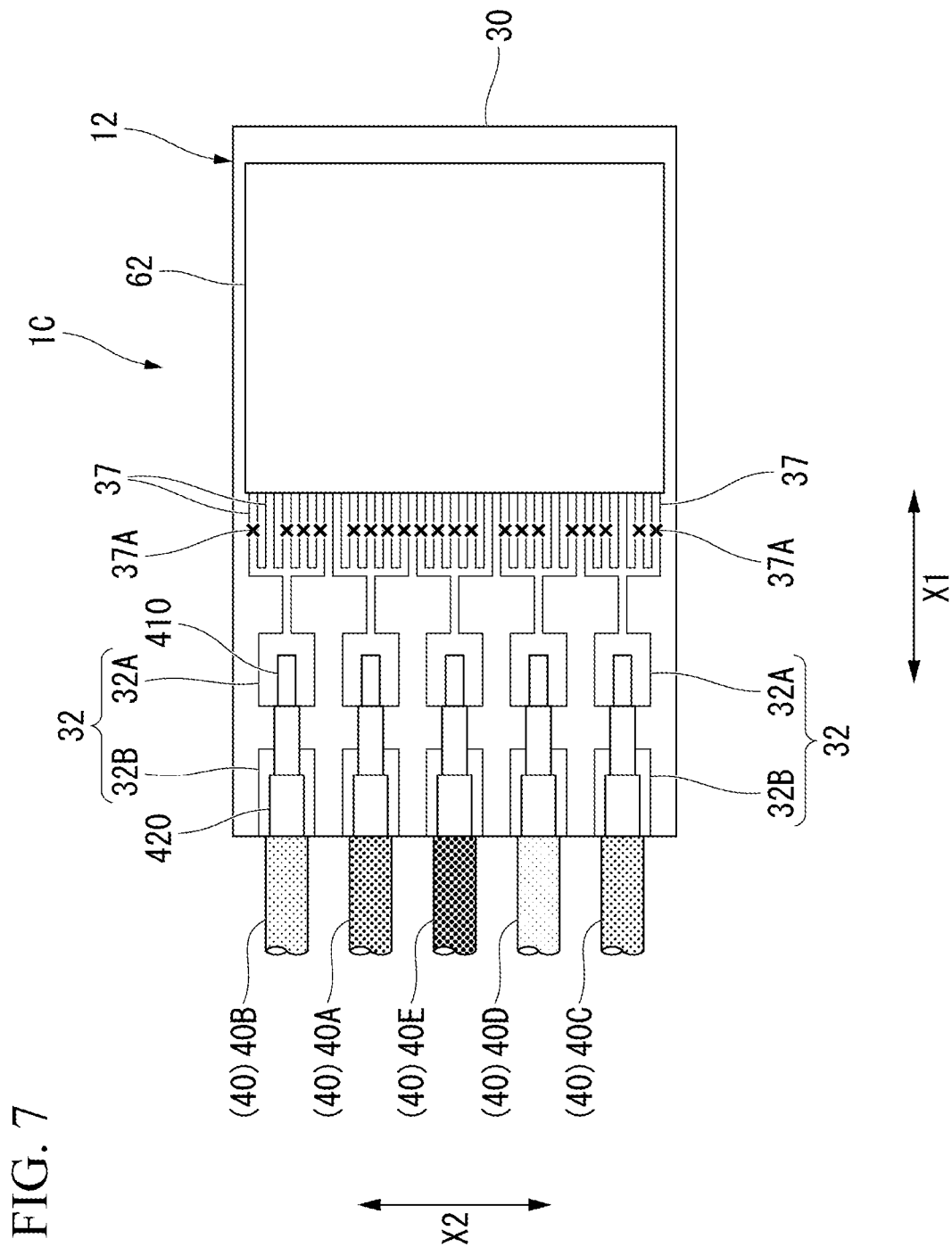
FIG. 7 is a plan view showing an outline of a connection portion of an endoscope according to a fourth embodiment.

As shown in FIG. 7, an endoscope 1C of a fourth embodiment is provided with a wiring adjustment mechanism 62 that can select a conduction destination by connecting the coaxial cable 40 of the second embodiment to each of the pads 21 and 32 and cutting an arbitrary circuit using, for example, laser or the like.

In the wiring adjustment mechanism 62, a plurality of second conduction tip portions 37 corresponding to all of the plurality of coaxial cables 40 (40A, 40B, 40C, 40D, and 40E) are provided for each of the plurality of (five) first pads 32A. Further, the plurality of first pads 32 are connected to all of the plurality of second conduction tip portions 37. A plurality of cutting portions 37A capable of selectively cutting an unnecessary circuit according to the wiring of the plurality of coaxial cables 40 are arranged in one direction (the width direction X2).

The second conduction tip portions 37 are provided at five positions corresponding to the number of coaxial cables 40 for one core wire pad 32A. Therefore, a total of 25 second conduction tips 37 are provided on the rear circuit board 30. The plurality of second conduction tip portions 37 protrude forward from the connector 3 and are connected to the core wire pad 32A.

In the connection method using the wiring adjustment mechanism 62 according to the fourth embodiment, a circuit is selectively cut in such a manner that the unnecessary second conduction tip portions 37 are cut by a cutting tool such as a cutter according to the wiring of the plurality of coaxial cables 40 to form the plurality of cutting portions 37A. That is, an arbitrary circuit can be formed by selectively connecting the plurality of second pads 32A and one of the plurality of first conduction tip portions 34.

Second Modified Example

Figure 8:
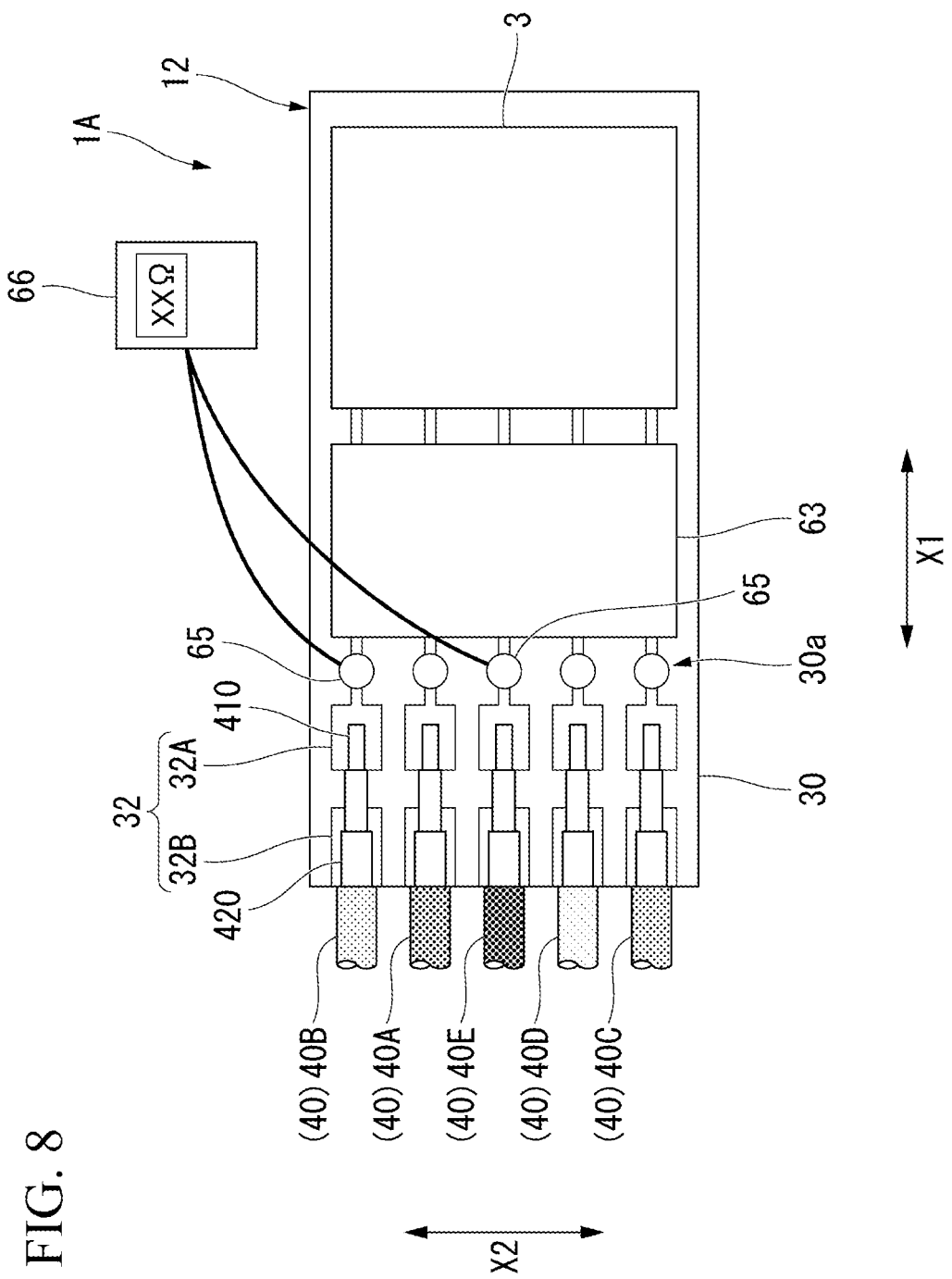
FIG. 8 is a plan view showing an outline of a connection portion of an endoscope according to a second modified example.

As shown in FIG. 8, a second modified example is a modified example of a method of manufacturing the endoscope 1A based on the above-described second embodiment. That is, in the second embodiment, the randomly colored coaxial cables 40 are photographed using the imaging device 70 (see FIG. 4), and array data is obtained through image processing. However, in the second modified example, the arrangement data is acquired by measuring impedance characteristics instead of the method using such an imaging device 70.

In the wiring alignment mechanism 63 (wiring adjustment mechanism), a plurality of test terminals 65 respectively corresponding to the plurality of (five) first pads 32A are provided in the rear circuit board 30. The plurality of test terminals 65 are arranged in one direction (the width direction X2). In the wiring alignment mechanism 63, the impedance characteristics of different test terminals 65 are measured using a measuring device 66.

In the second modified example, when manufacturing the endoscope 1, the arrangement data of the plurality of coaxial cables 40 is obtained by measuring the impedance characteristics of the plurality of coaxial cables 40 by the electrical test on the base end side of the first pad 32 which is on the side of the connector 3 and the arrangement data is input to the wiring adjustment mechanism 61. In this way, in the second modified example, since there is no need to classify the colors of the cables, the material cost for the cables can be reduced.

Furthermore, the method of acquiring arrangement data by measuring impedance characteristics according to the second modified example and the method of acquiring arrangement data by performing image processing using the imaging device 70 according to the second embodiment may be used in combination.

Although preferred embodiments and modified examples of the present disclosure have been described above along with examples, the present disclosure is not limited to these embodiments, modified examples, and examples. Additions, omissions, substitutions, and other changes to the configuration are possible without departing from the spirit of the disclosure.

Further, the present disclosure is not limited by the foregoing description, but only by the scope of the claims appended hereto.

The present disclosure can be applied to the endoscope and the endoscope manufacturing method.

What is claimed is:
1. An endoscope comprising:
  a first substrate comprising:
    a plurality of first pads;
    a plurality of second pads configured to be connected to a connection body; and
    a wiring adjustment circuit disposed between the plurality of first pads and the plurality of second pads,
  a plurality of first cables, each of the plurality of first cables including a first end, the first end connected to the plurality of first pads;
  wherein the wiring adjustment circuit is configured to electrically connect each of the plurality of first pads to each of the plurality of second pads corresponding to each of the plurality of first cables.

2. The endoscope according to claim 1, further comprising:
   a distal end portion configured to insert into a subject, the distal end portion comprising:
      an imager; and
      a second substrate comprising a plurality of third pads connected to the imager,
   wherein each of the plurality of first cables includes a second end, each of the second end is connected to each of the plurality of third pads.

3. The endoscope according to claim 2,
   wherein the plurality of first cables are coaxial cables each including a core wire and a shield, and
   wherein the plurality of third pads includes a core wire pad connected to the core wire and a shield pad connected to the shield.

4. The endoscope according to claim 3, wherein at least one of the plurality of third pads is provided to electrically connect the core wire pad and the shield pad.

5. The endoscope according to claim 2, wherein an arrangement of the first end of the plurality of first cables is different from an arrangement of the second end of the plurality of first cables.

6. The endoscope according to claim 2, further comprising:
   the connection body configured to be connected to an external processor,
   wherein the wiring adjustment circuit is configured to electrically connect from the imager to the external processor.

7. The endoscope according to claim 1, wherein the wiring adjustment circuit includes at least one of a first wiring route and a second wiring route,
   the first wiring route from one of the plurality of first pads to one of the plurality of second pads corresponding to one of the plurality of first cables,
   the second wiring route from one of the plurality of second pads to one of the plurality of first pads to which one of the plurality of first cables corresponding to the one of the plurality of second pads connected.

8. The endoscope according to claim 1, further comprising:
   the connection body configured to be connected to an external processor.

9. The endoscope according to claim 8, wherein an arrangement of the first end of the plurality of first cables is different from an arrangement of the connection body.

10. The endoscope according to claim 1,
    wherein a width of the plurality of first pads is orthogonal to a direction in which the plurality of first cables extends, and
    wherein the width of the plurality of first pads is equal to or larger than an outer diameter of the thickest one among the plurality of first cables.

11. The endoscope according to claim 1, wherein the wiring adjustment circuit includes a circuit installation area in which a bridge circuit configured to be incorporated, the bridge circuit aligns a wiring according to a wiring pattern of the plurality of first cables on the plurality of first pads.

12. The endoscope according to claim 1, wherein the wiring adjustment circuit is configured to switch a wiring using a program according to a wiring pattern of the plurality of first cables on the plurality of first pads.

13. The endoscope according to claim 1,
    wherein the wiring adjustment circuit includes a plurality of conduction portions corresponding to all of the plurality of first cables for each of the plurality of first pads,
    wherein the each of the plurality of first pads and one of the plurality of conduction portions are selectively connected according to the plurality of first cables.

14. The endoscope according to claim 13, wherein the each of the plurality of first pads and the one of the plurality of conduction portions is connected by soldering.

15. The endoscope according to claim 13, wherein the each of the plurality of first pads and the one of the plurality of conduction portions is connected by a jumper wire.

16. The endoscope according to claim 1,
    wherein the wiring adjustment circuit includes a plurality of conduction portions corresponding to all of the plurality of first cables for each of the plurality of first pads,
    wherein the each of the plurality of first pads are connected to all of the plurality of conduction portions, and
    wherein a cutting portion disposed in each of the plurality of conduction portions, the cutting portion of an unnecessary circuit among the plurality of conduction portions is configured to selectively cut off according to a wiring pattern of the plurality of first cables connected to the each of the plurality of first pads.

17. A method of manufacturing an endoscope comprising:
    providing a plurality of first pads and a plurality of second pads on a first substrate;
    connecting a first end of each of a plurality of first cables to each of the plurality of first pads; and
    adjusting a wiring between the plurality of first pads and the plurality of second pads according to a wiring pattern of the plurality of first cables on the plurality of first pads by a wiring adjustment circuit.

18. The method of manufacturing the endoscope according to claim 17, further comprising:
    providing a plurality of third pads on a second substrate;
    connecting a second end of each of the plurality of first cables to each of the plurality of third pads.

19. The method of manufacturing the endoscope according to claim 17, further comprising:
    respectively classifying the plurality of first cables into different colors,
    identifying the colors of the plurality of first cables using an imaging device;
    acquiring arrangement data of the plurality of first cables by the identifying; and
    inputting the arrangement data to the wiring adjustment circuit.

20. The method of manufacturing the endoscope according to claim 17, further comprising:
    measuring impedance characteristics of each of the plurality of first cables at a position between the plurality of first pads and the wiring adjustment circuit;
    acquiring arrangement data of the plurality of first cables by the measuring; and
    inputting the arrangement data to the wiring adjustment circuit.

* * * * *